(12) United States Patent
Busropan et al.

(10) Patent No.: US 9,913,072 B2
(45) Date of Patent: *Mar. 6, 2018

(54) METHOD AND TELECOMMUNICATIONS NETWORK FOR CONTROLLING ACTIVATION OF AT LEAST ONE TERMINAL IN A MACHINE-TYPE COMMUNICATION APPLICATION

(71) Applicants: Koninklijke KPN N.V., The Hague (NL); Nederlandse Organisatie Voor Toegepast-Natuurwetenschappelijk Onderzoek TNO, Delft (NL)

(72) Inventors: Bryan Jerrel Busropan, Leidschendam (NL); Johannes Maria Van Loon, Zoetermeer (NL)

(73) Assignees: Koninklijke KPN N.V., The Hague (NL); Nederlandse Organisatie voor Toegepast-Natuurwetenschappelijk Onderzoek TNO, The Hague (NL)

( * ) Notice: Subject to any disclaimer, the term of this patent is extended or adjusted under 35 U.S.C. 154(b) by 759 days.

This patent is subject to a terminal disclaimer.

(21) Appl. No.: 13/729,491

(22) Filed: Dec. 28, 2012

(65) Prior Publication Data

US 2013/0188549 A1    Jul. 25, 2013

Related U.S. Application Data

(63) Continuation of application No. 13/500,250, filed as application No. PCT/EP2010/064797 on Oct. 5, 2010.

(30) Foreign Application Priority Data

Oct. 5, 2009    (EP) .................................. 09172248

(51) Int. Cl.
*H04B 1/16*    (2006.01)
*H04W 4/00*    (2018.01)
(Continued)

(52) U.S. Cl.
CPC ........... *H04W 4/005* (2013.01); *H04W 68/00* (2013.01); *H04W 4/06* (2013.01); *H04W 84/18* (2013.01)

(58) Field of Classification Search
CPC ............................. H04W 84/045; H04W 8/22
(Continued)

(56) References Cited

U.S. PATENT DOCUMENTS

| 6,600,917 B1 | 7/2003 | Maupin | |
| 2003/0040313 A1* | 2/2003 | Hogan | H04W 60/00 455/435.1 |

(Continued)

FOREIGN PATENT DOCUMENTS

| JP | 2007-235224 | 9/2007 |
| JP | 2008-077421 | 4/2008 |

(Continued)

OTHER PUBLICATIONS

JP 2012-532564, English Translation of Notice of Reason for Rejection, dated Jun. 20, 2013, 3 pages.
(Continued)

*Primary Examiner* — Kiet Doan
(74) *Attorney, Agent, or Firm* — McDonnell Boehnen Hulbert & Berghoff LLP

(57) ABSTRACT

The invention relates to a method for controlling activation of at least one terminal in a machine-type communication application using a wireless access network. The wireless access network comprises a number of location areas, each of the location areas comprising a plurality of cells. The terminal has been assigned an identifier. First, a location (Continued)

identifier is received from a location provider, the location identifier indicating a subset of cells of at least one of the location areas. Activation of the at least one terminal is then controlled by transmitting at least one broadcast message on at least one cell broadcast channel in the cells of the subset indicated by the location identifier. The broadcast message contains the identifier or identifier part assigned to the terminal, such that the at least one terminal is signalled that the broadcast message is intended for him. An activation control system and a mobile terminal for use with such a system are also disclosed.

13 Claims, 3 Drawing Sheets

(51) Int. Cl.
*H04W 68/00* (2009.01)
*H04W 4/06* (2009.01)
*H04W 84/18* (2009.01)

(58) Field of Classification Search
USPC .... 455/452.1, 411, 416, 456.3, 435.1, 414.1, 455/412.2, 435, 404.1, 450, 452.2, 3.01; 370/329, 338; 709/201, 203
See application file for complete search history.

(56) References Cited

U.S. PATENT DOCUMENTS

| | | | |
|---|---|---|---|
| 2005/0181767 A1* | 8/2005 | Boland | H04M 3/537 455/412.2 |
| 2006/0046762 A1 | 3/2006 | Yoon et al. | |
| 2007/0281674 A1 | 12/2007 | Mock et al. | |
| 2008/0153521 A1 | 6/2008 | Benaouda et al. | |
| 2009/0275323 A1 | 11/2009 | Pedersen et al. | |
| 2010/0151813 A1* | 6/2010 | Faerber | H04W 68/00 455/404.1 |

FOREIGN PATENT DOCUMENTS

| | | |
|---|---|---|
| WO | 9957927 A1 | 11/1999 |
| WO | 2005/046188 A1 | 5/2005 |
| WO | 2008031268 A1 | 3/2008 |
| WO | 2008/119814 A1 | 10/2008 |
| WO | 2011/042417 A2 | 4/2011 |

OTHER PUBLICATIONS

JP 2012-271238, English Translation of Notice of Reason for Rejection, dated Dec. 10, 2013, 6 pages.
3rd Generation Partnership Project; Technical Specification Group Core Network and Terminals; Technical Realization of Cell Broadcast Service (CBS) (Release 11), 3GPP TS 23.041 V11.2.0 (Mar. 2012), pp. 1-57.
3rd Generation Partnership Project; Technical Specification Group Services and System Aspects; Service Requirements for Machine-Type Communications (MTC); Stage 1 (Release 11), 3GPP TS 22.368 V11.4.0 (Mar. 2012), pp. 1-25.
Extended European Search Report for 09172248.8-2414 dated Jun. 14, 2010.
Partial European Search Report (R. 64 EPC) for 09172248.8-2414 dated Mar. 29, 2010.
Written Opinion and International Search Report for PCT/EP2010/064797 dated May 25, 2011.
Mouly M. et al., The GSM System for Moile Communications, Jan. 1, 1992, GSM System for Mobile Communications. Comprehensive Overview of the European Digital Cellular Systems, Cell and Sys, France, pp. 366-384.
European Patent Office Action for Application No. 10 760 701.2-1854 dated Nov. 13, 2015 (5 pages).
Sanders et al., Advantages and Services Using Cell Broadcast—Reaching Millions in a Matter of Seconds, Cell Broadcast Forum, Feb. 2002 (21 pages).
European Search Report from Application No. EP 12 19 2898 dated Jun. 17, 2013.

* cited by examiner

METHOD AND TELECOMMUNICATIONS NETWORK FOR CONTROLLING ACTIVATION OF AT LEAST ONE TERMINAL IN A MACHINE-TYPE COMMUNICATION APPLICATION

CROSS-REFERENCE TO RELATED APPLICATIONS

This application is a continuation of U.S. patent application Ser. No. 13/500,250, filed May 10, 2012, which is a U.S. National Stage Entry of International Application No. PCT/EP2010/064797, filed on Oct. 5, 2010, which claims the benefit of European Application No. 09172248.8 filed on Oct. 5, 2009, each of which is incorporated herein in its entirety.

FIELD OF THE INVENTION

The invention relates to the field of telecommunications. More specifically, the invention relates to the field of controlling activation of a number of terminals in a machine-type communication wireless access communications environment.

BACKGROUND OF THE INVENTION

Wireless access telecommunications networks (e.g. GSM, UMTS, LTE) have developed tremendously over the past years. In such networks, voice and data services can be provided to terminals having a high mobility, i.e. the terminals move freely through the area covered by the network.

For mobile-terminated calls, i.e. calls made to the mobile terminal, it is essential for the network to locate the terminal in order to set up the connection. To that end, the network has a location management procedure in place.

The telecommunications network is divided into a plurality of location areas (LA). Location areas generally comprise a large number of cells, one or more cells being associated with a base station. The terminal moving through the area keeps the network informed if there is a change of its current location area. However, the knowledge of the location area is generally insufficient for setting up a mobile-terminated call. Thus, prior to setting up a mobile-terminated call, more detailed information about the location of the terminal should be obtained.

As an example, an incoming call request arrives on a gateway mobile switching centre (GMSC) and contains the MSISDN number of the mobile terminal to be contacted. The MSISDN number is used to obtain location information from a Home Location Register (HLR). The HLR uses the MSISDN to identify the address of the Mobile Switching Centre (MSC) currently serving the mobile terminal. The GMSC then uses the MSC address to route the call request to the MSC currently serving the mobile terminal. The MSC determines the location area where the mobile station is registered and sends a message to all base station controllers (BSCs) controlling cells in this location area. The message contains the network identity (TMSI or IMSI) of the mobile terminal and is broadcast in all cells of the location area as a paging message on a paging channel PCH. The mobile terminal regularly (e.g. several times per second) monitors the paging channel PCH and receives the paging message and responds to it when it finds that the TMSI or IMSI in the paging message matches its own TMSI or IMSI. The TMSI or IMSI is known to the terminal; the IMSI is typically stored on the subscriber identity module (SIM) of the mobile terminal.

The mobile terminal generally needs to respond quickly to the paging message, since otherwise the caller may hang up. Therefore, the mobile terminal will respond to the paging message by sending a channel request on a random access channel (RACH). The base station receiving the channel request now knows in which cell the mobile terminal is located and the network assigns radio resources for establishing the connection.

While the above example is based on the establishment of a mobile terminated call in a GSM network, similar steps are taken in other wireless access telecommunications networks, such as UMTS and LTE.

The availability of the above-mentioned wireless access networks has resulted in demands for further services using these networks, including services that relate to so-called machine-type communication (MTC) services. Machine-type communication is currently being standardised in 3GPP, e.g. see TS 22.368. MTC applications typically involve hundreds, thousands or millions of communication modules. Some applications only rarely require access to a telecommunications network. An example involves collecting information by a server from e.g. smart electricity meters at the homes of a large customer base. Other examples include sensors, meters, coffee machines etc. that can be equipped with communication modules that allow for reporting status information to a data processing centre over the telecommunications network. Such devices may also be monitored from a server. The data processing centre may e.g. store the data and/or provide a schedule for maintenance people to repair a machine, meter, sensor etc.

SUMMARY OF THE INVENTION

A method is disclosed for controlling activation of at least one terminal in a machine-type communication application using a wireless access network. The wireless access network comprises a number of location areas, each of the location areas comprising a plurality of cells. The terminal has been assigned an identifier. First, a location identifier is received from a location provider, the location identifier indicating a subset of cells of at least one of the location areas. Activation of the at least one terminal is then controlled by transmitting at least one broadcast message on at least one cell broadcast channel in the cells of the subset indicated by the location identifier. The broadcast message contains the identifier assigned to the terminal, such that the at least one terminal is signalled that the broadcast message is intended for it.

Furthermore, an activation control system configured for controlling activation of at least one terminal in a machine-type communication application using such a wireless access network is disclosed. The system comprises a receiver configured for receiving a location identifier from a location provider, the location identifier indicating a subset of cells of at least one of the location areas. Also, an activation controller is provided that is configured for controlling activation of the at least one terminal by transmitting at least one broadcast message on at least one cell broadcast channel in the cells of the subset indicated by the location identifier, wherein the broadcast message contains the identifier assigned to the at least one terminal.

A machine-type communication terminal configured for operating in the method and system as defined in the present disclosure is also disclosed. The terminal comprises a receiver for receiving the broadcast message on the cell broadcast channel and a processor for processing the broadcast message when the identifier assigned to the terminal contained in the broadcast message matches a terminal identifier, the identifier optionally being a network-unrelated identifier. The terminal has a controller for controlling activation of the terminal, particularly establishing a connection with the wireless access network, following processing of the broadcast message.

It should be noted that the activation control method and system may apply multiple cell broadcast channels of the wireless access network. Different terminals, possibly owned by different MTC providers, may be programmed to tune to different cell broadcast channels.

The terminals are generally activated with the aim of establishing a connection with the wireless access network. Activation control of the terminals may include the possibility to delay activation of the terminals after receiving the broadcast message and the possibility to schedule activation of the terminal.

It should be appreciated that for GPRS, the location area LA is typically referred to as Routing Area (RA). For the present application, location area (LA) and routing area (RA) are taken as synonyms.

The applicant has acknowledged that for many machine-type communication (MTC) applications the terminal mobility is considerably lower than for normal wireless telephony. The location of the MTC terminal may be substantially fixed, i.e. the terminal will normally not move out of a cell, or may most likely be in a limited subset of cells. The (approximately) known location can be used to advantage to determine in which cell(s) the activation control message for triggering the terminal should be broadcast without retrieving routing information from the Home Location Register (HLR) and/or the Visitor Location Register (VLR). This in turn obviates the need to store terminal location information in the HLR and/or the VLR and obviates the need for location management procedures. This provides considerable savings since the number of MTC terminals may be rather high.

The broadcast message is broadcast over the cell broadcast channel CBCH as opposed to the paging channel PCH currently used for transmitting activation messages. In this manner, the load for the paging channels is considerably reduced. Transmitting a broadcast message to a terminal via the cell broadcast channel CBCH may be slower than transmitting a paging message to a terminal via the dedicated paging channel PCH, but the applicant has realized that this aspect may be of less relevance for many MTC applications. By omitting the need to page terminals over the paging channel PCH, various limitations from conventional wireless telephony can be circumvented. Examples of restrictions include the type of instructions that may be provided, the restriction of using a network-related identifier (such as TMSI or IMSI), the strict time regime for responding to a page and the requirement of frequently monitoring the paging channel. Examples of embodiments of the present invention wherein the restrictions are avoided include the wide range of activation parameters that can be used in the broadcast message (see claim 2), not limiting response by the terminal to an access request on the random access channel (RACH), the use of network-unrelated identifiers (claim 3) for indicating the terminal for which the broadcast message is intended and not requiring direct responses to the broadcast message. Furthermore, the terminals may be programmed to monitor the cell broadcast channel less frequently or only during particular periods of time of the day or week.

It should be appreciated that the location identifier of a subsets of cells may be received from the location provider and stored in the wireless access telecommunications network prior to the instruction for sending broadcast messages. The stored location identifier may then be used for identifying the cells of the subset in which the broadcast message for controlling activation of the terminals should be transmitted.

It should further be appreciated that the number of cells in the subset is usually small. Ideally, a terminal is located within one cell. However, the cell boundaries are generally not entirely fixed but may be subject to reconfiguration by the network operator and also may fluctuate to some extent, dependent on e.g. environmental conditions, such that terminals at a substantially fixed location near a cell boundary may find themselves in different cells now and then. Therefore, the number of cells of the subset may be set greater than 1, e.g. 2, 3, 5 or 10.

Generally, the location identifier or identifiers are selected such that they correspond to the cells of the subset where the terminals are expected to be located. In principle, however, the location identifier only designates the subset(s) of the cells where the broadcast message should be transmitted over the cell broadcast channel. As an example, an organization owns a plurality of terminals distributed over an area, such as a country, but does not have detailed information about the exact location of the terminals. Groups of terminals have been assigned group identifiers and terminals with a common group identifier have been appropriately distributed over the area, i.e. terminals with a common group identifier are not located in the same cell. By transmitting broadcast messages for a particular group identifier on a cell broadcast channel of the area, or subsequent parts thereof, activation of the terminals having been assigned the group identifier is controlled. In such an example, the number of cells of the subset may be considerably large.

The identifier assigned to the terminal for determining whether the broadcast message is destined for it is not necessarily the same identifier used for establishing a connection with the wireless access network.

As mentioned, the identifier assigned to the terminals are not necessarily network related identifiers, such as TMSI or IMSI, i.e. identifiers that the network uses to distinguish between terminals. Examples of network-unrelated identifiers include application identifiers on which basis the owners of the terminals can distinguish between terminals. The use of a network-unrelated identifier obviates the need to register such identifiers by the operator of the wireless access network.

Several terminals may have been assigned a common group identifier, network-related or network-unrelated, on the basis of which the activation of groups of terminals may be controlled. The use of a common network-related group identifier may require measures, such as subsequent activation of terminals, in order for the network to appropriately process the received request for establishing a connection from the terminals, particularly when the terminals are located in the same cell. In particular, the activation control is such that during the connection period of one terminal, a connection request by another terminal with the same network-related identifier does not occur when these terminals are in the same cell. The control may be extended to terminals in neighbouring cells.

Even when terminals have been assigned individual identifiers, multiple terminals may be addressed on the cell broadcast channel at once by a single broadcast message, e.g. by indicating a part of the terminal identifier in combination with a indication that the remainder of the identifier is not relevant, e.g. an asterisk (*). An alternative includes the use of ranges. These types of identifiers are considered to be group identifiers as well.

The identifier assigned to a terminal may also be a terminal condition, e.g. a software version applied by a terminal or a subscription specified for the terminal.

Hereinafter, an embodiment of the invention will be described in further detail. It should be appreciated, however, that these embodiments may not be construed as limiting the scope of protection for the present invention.

DETAILED DESCRIPTION OF THE DRAWINGS

Figure 1:
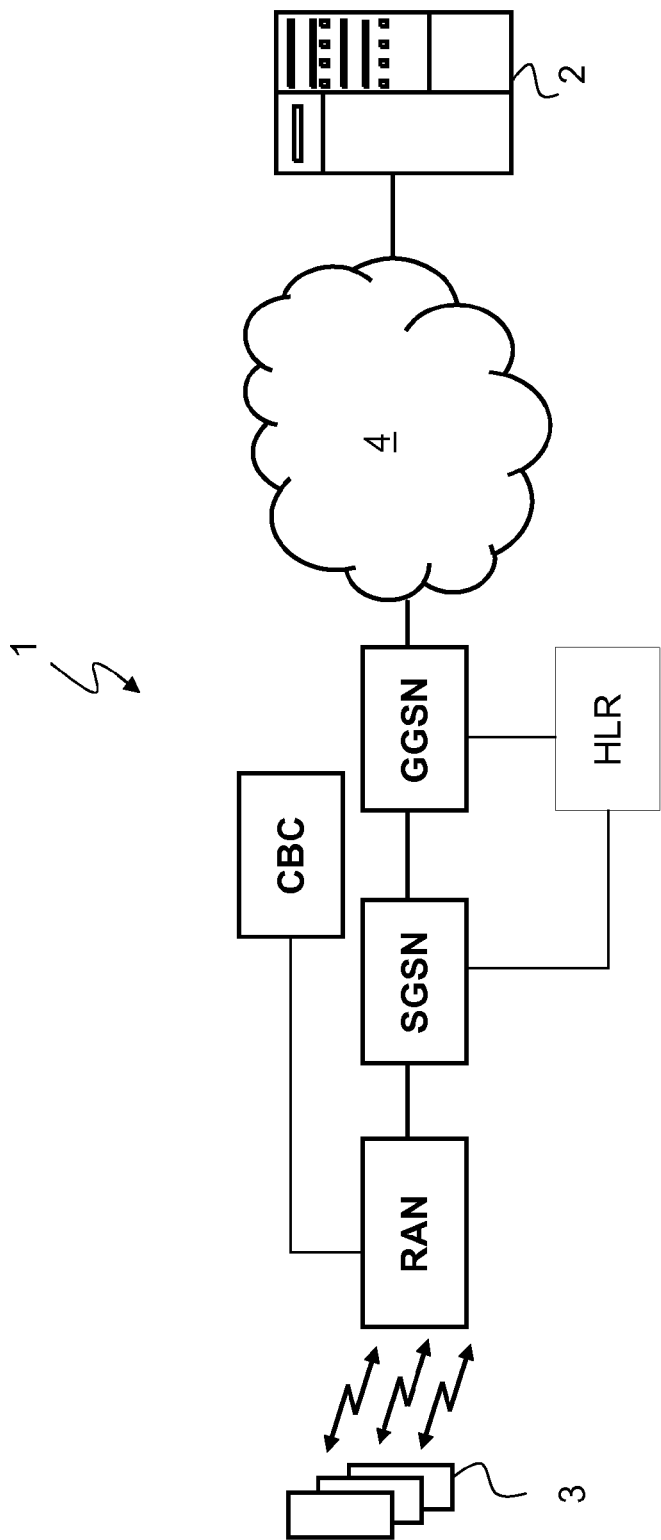
FIG. 1 depicts a schematic illustration of a wireless access telecommunications network containing components of an activation control system for a MTC application according to an embodiment of the present invention.

FIG. 1 shows a schematic illustration of a wireless access telecommunications network 1 for MTC applications. The telecommunications network 1 allows data sessions between a server 2 and terminals 3 over a packet data network 4, wherein access of the terminal to the telecommunications network 1 is wireless. In an MTC environment, a single server 2 normally is used for communication with a large number of terminals 3.

Particularly, FIG. 1 depicts a GPRS or UMTS telecommunications network comprising a Gateway GPRS Support Node (GGSN), a Serving GPRS Support Node (SGSN) and a Radio Access Network (RAN or UTRAN). For a GSM/EDGE radio access network (GERAN), the RAN comprises a Base Station Controller (BSC) connected to a plurality of Base Station Transceivers (BTSs), both not shown. For a UMTS radio access network (UTRAN), the RAN comprises a Radio Network Controller (RNC) connected to a plurality of NodeBs), also not shown. The GGSN and the SGSN are conventionally connected to a Home Location Register (HLR) that may contain subscription information of the terminals 3.

For such a network, the SGSN typically controls the connection between the telecommunications network 1 and the terminals 3. It should be appreciated that the telecommunications network 1 generally comprises a plurality of SGSNs, wherein each of the SGSNs is connected typically to several BSCs/RNCs to provide a packet service for terminals 3 via several base stations/NodeBs.

The GGSN is connected to the packet data network 4, e.g. the internet, a corporate network or a network of another operator. On the other side, the GGSN is connected to one or more SGSNs.

The GGSN is configured for receiving a data unit for the terminal 3 from the server 2 over the network 4 and for transmitting a data unit to the server 2 received from the terminal 3.

The network 1 comprises a cell broadcast centre CBC, also referred to a Short Message Service Cell Broadcast (SMSCB). Cell broadcast technical information is disclosed in TS 23.041, which is incorporated in the present application in its entirety. The geographic area wherein a cell broadcast message is transmitted is indicated by a Geographical Scope (GS) indicator.

Figure 2:
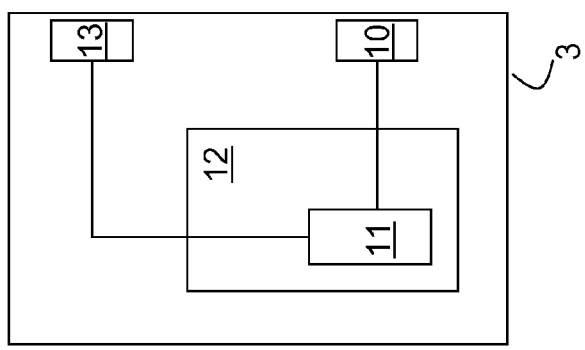
FIG. 2 shows a schematic illustration of an MTC terminal according to an embodiment of the example.

FIG. 2 is a schematic illustration of an MTC terminal 3 according to an embodiment of the invention. The terminal 3 comprises a receiver 10 for receiving a cell broadcast channel upon instruction by a controller 11. Once a broadcast message is received, a processor 12 processes the broadcast message as to whether an identifier contained in the message corresponds to a terminal identifier that is locally available. The terminal identifier may be a network related ID, e.g. an IMSI stored in a storage module of the terminal 3, but is advantageously a network-unrelated identifier, e.g. an application identifier or a terminal identifier assigned by the MTC service provider and stored in a storage module of the terminal 3. Once the identifier contained in the broadcast message corresponds to terminal identifier, the processor 12 further processes the broadcast message. This may include analysing the broadcast message for particular instructions, such as activation parameters, and storing and/or executing these instructions at some point in time.

The broadcast message does not necessarily contain further instructions. The terminal 3 may be programmed such that when a broadcast message is received over the cell broadcast channel, the mere receipt of this message triggers further actination, possibly after some pre-programmed time delay, of the terminal 3.

One example of the activation includes the transmitting of a request, using transmitter 13, for establishing a connection with the radio access network RAN and, possibly, the setting up of a PDP context in order to exchange data with the server 2.

The operation of the telecommunication network 1 will now be described in further detail with reference to FIGS. 3 and 4.

Figure 3:
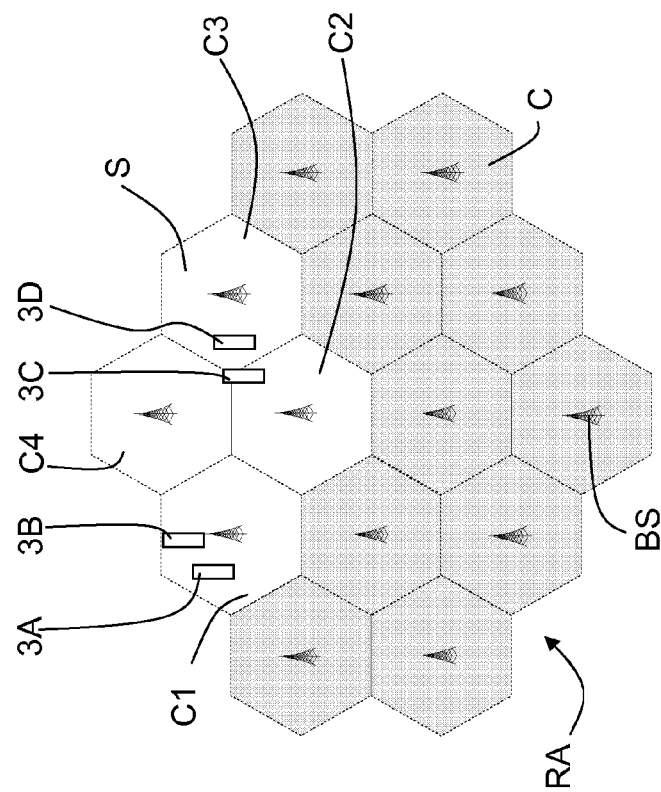
FIG. 3 is a schematic illustration of a cell configuration of the wireless access telecommunications network of FIG. 1.
Figure 4:
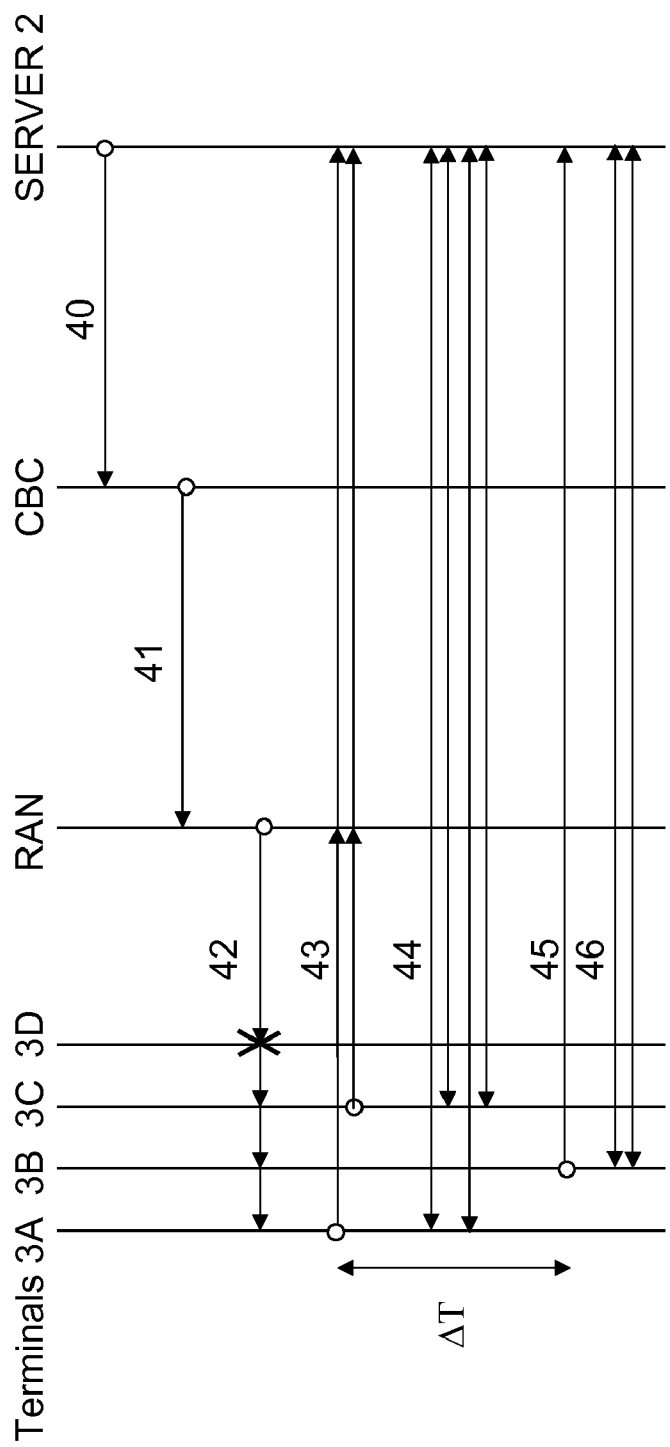
FIG. 4 is a signal-time chart indicating some steps of the method for controlling activation of the MTC terminal of FIG. 2.

FIG. 3 shows a schematic example of a routing area RA of a telecommunications network 1 showing base stations BS of the RAN defining cells C. MTC communication terminals 3A-3D are provided in a subset S, indicated by the darker cells C. Terminals 3A, 3B are located in the same cell C1. Terminals 3C, 3D are located in further cells C2, C3, respectively.

In the exemplary embodiment, it is assumed that terminals 3A-3D have the same IMSI and are programmed to use the IMSI to establish a connection with the wireless access network 3. This requires the HLR to store a single IMSI entry for all terminals 3A-3D.

Furthermore, the terminals 3A-3D have been assigned identifiers ID_A, ID_B, ID_C and ID_D, respectively for controlling activation of the terminals on a cell broadcast channel. It will be assumed that these identifiers are network-unrelated identifiers, i.e. identifiers which need not to be registered within the telecommunications network 1, e.g. application identifiers.

The organization applying server 2 knows that terminals 3A-3D are in the indicated cells of subset S={C1, C2, C3, C4} and requires to exchange date with terminals 3A, 3B and 3C, but not with 3D. The exact location of terminal 3C is not known, but it is, for example based on historic data, more likely to be located in one of the cells C2, C3, C4. To that end, in step 40 a cell broadcast request is sent from server 2 to the CBC comprising a location identifier indicating in which cells C (viz. C1, C2, C3, C4) the broadcast message should be transmitted on the cell broadcast channel. Of course, terminals 3 are programmed to listen to the cell broadcast channel. Server 2 also sends the identifiers assigned to the terminals to be activated by providing a range ID_A . . . C in order to indicate terminals 3A-3C and to exclude terminal 3D. Alternatively, the broadcast message could have been sent in the subset S={C1, C2} to exclude a response from terminal 3D and if terminal 3C would have been known to be most likely located in cell C2.

In step 41, CBC sends the request to the RAN, particularly the base stations BS thereof, to transmit the broadcast message on the cell broadcast channel of the cells C of subset S, the broadcast message including the identifier ID_A . . . C for indicating the terminals for which the broadcast message is intended.

In step 42, terminals 3A-3D receive the broadcast message. Upon processing the received broadcast message, terminals 3A-3C will further process the broadcast message when determining that an identifier in the received broadcast message (e.g. ID_A . . . C) corresponds to the local application identifier (e.g. ID_A, ID_B, ID_C for terminals 3A, 3B, 3C, respectively). Terminal 3D will not further process the broadcast message (indicated by the cross in FIG. 4 at terminal 3D), since the broadcast message does not contain an identifier corresponding to the local application identifier, such as ID_D.

Terminals 3A and 3C, not being in the same cell C of the subset S, may be activated substantially simultaneously and request establishment of a PDP context using the same IMSI, shown in step 43. A data exchange may now be performed, as depicted by the exchange of several messages in step 44.

Terminal 3B, being in the same cell C1 as terminal 3A, cannot be activated and cannot have a connection simultaneously with terminal 3A, since both terminals use the same IMSI. Therefore, activation of terminal 3B is controlled such that terminal 3B only sends a request to establish a PDP context after some time delay ΔT after receiving and processing the broadcast message, illustrated by step 45. Step 46 represents the data exchange messages between terminal 3B and server 2.

The difference in activation behaviour between terminals 3A and 3B may be obtained by including activation parameters, e.g. indicating time delay ΔT, in the broadcast message received over the cell broadcast channel. Alternatively, terminals 3A, 3B are pre-programmed such that terminal 3B waits a pre-determined time ΔT after receiving and processing the broadcast message whereas terminal 3A responds immediately. Random time intervals may also be used in order to reduce the statistic chance of conflicting activation of terminals.

The area in which terminals of the organization applying server 2 are present may be larger than indicated in FIG. 3. In that case, a broadcast message may subsequently transmitted in a further subset S of cells C to control activation of terminals 3 in this further subset of cells. In this manner, the number of activated terminals 3 can also be controlled.

Location information may change due to reconfiguration of cells C by an operator or at times when a terminal 3 moves. A mechanism may be put in place wherein the location of terminals 3 is updated, for example based on a recording of one or more cell identifiers via which a given terminal in a recent past has submitted a request to establish a connection and has exchanged data with server 2. This can be further supplemented by introducing a periodic, occasional or opportunistic request in eventually all cells of a network to trace lost terminals or to program the terminal to send an update of its location. This information may be stored in server 2 or in the telecommunications network.

The above-described embodiment allows to reduce the need for terminals to be provisioned with unique MSISDN numbers and for the telecommunications network operator to register the location of the terminals in order to activate these terminals. The addressing of multiple terminals, such as by the use of group identifiers, the use of (partial) wildcards and the use of ranges, reduces the load of broadcast messages to be transmitted on the cell broadcast channel in order to activate a population of terminals. Broadcasting can be targeted to those cells where the terminals are expected to be located. Knowledge of these cells may also be obtained from historic data. Whereas the activation request is made via the telecommunications network using the cell broadcast channel, establishing the data connection is initiated by the terminal.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention claimed is:

1. A method for controlling activation of a plurality of terminals in a machine-type communication application using a wireless access network, the wireless access network including a number of location areas, each of the location areas including a plurality of cells, the terminals having been assigned an identifier, the method comprising:
   receiving a location identifier from a location provider, the location identifier indicating a subset of cells of at least one of the location areas;
   controlling activation of the terminals by:
      omitting transmitting a paging message over a paging channel to activate the terminals,
      transmitting at least one broadcast message on at least one cell broadcast channel in the indicated cells of the subset on the basis of the identifier or an identifier part assigned to the terminals, wherein transmitting the at least one broadcast message is performed without retrieving routing information from a Home Location Register and/or a Visitor Location Register, and wherein the broadcast message contains a group network-related identifier or a group network-related identifier part assigned to the terminals,
      receiving terminal-initiated request messages from the terminals for establishing a connection with the wireless access network following the transmitting of the at least one broadcast message, and
      activating the terminals in response to the wireless access network receiving the terminal-initiated request messages; and exchanging data over the established connection with the terminals from which the terminal-initiated request messages are received.

2. The method according to claim 1, wherein the broadcast message contains at least one activation parameter.

3. The method according to claim 1, further comprising receiving terminal-initiated request messages at the wireless access network for establishing a connection with the wireless access network from at least two of the plurality of terminals in a cell of the subset at different points in time, wherein the points in time are different in that a connection of a first terminal is terminated before the terminal-initiated request message of a second terminal is received.

4. The method according to claim 1, further comprising receiving terminal-initiated request messages at the wireless access network for establishing a connection with the wireless access network from at least two of the plurality of terminals in different cells of the subset.

5. The method according to claim 1, further comprising transmitting a subsequent broadcast message in different subsets of at least one location area.

6. The method according to claim 1, further comprising receiving terminal location information from the terminals at the location provider.

7. A machine-type communication terminal configured for operating in the method according to claim 1, the terminal comprising:
a receiver for receiving the broadcast message on the cell broadcast channel;
a processor for verifying whether an identifier contained in the broadcast message matches a terminal identifier; and
a controller for controlling activation of the terminal, particularly establishing a connection with the wireless access network, when the identifier contained in the broadcast message matches the terminal identifier.

8. The method according to claim 1, wherein the paging channel is a dedicated paging channel.

9. An activation control system configured for controlling activation of a plurality of terminals in a machine-type communication application using a wireless access network, the wireless access network including a number of location areas, each of the location areas including a plurality of cells, the terminals having been assigned an identifier, the system comprising:
a receiver configured for receiving a location identifier from a location provider, the location identifier indicating a subset of cells of at least one of the location areas;
an activation controller configured for controlling activation of the terminals without transmitting a paging message over a dedicated paging channel, and instead:
transmitting at least one broadcast message on at least one cell broadcast channel in the indicated cells of the subset on the basis of the identifier or an identifier part assigned to the terminals, and without retrieving routing information from a Home Location Register and/or a Visitor Location Register, wherein the broadcast message contains a group network-related identifier or a group network-related identifier part assigned to the terminals; and
activating the terminals in response to receiving, following the transmitting of the at least one broadcast message, terminal-initiated request messages from the terminals for establishing a connection with the wireless access network; and
a data exchanger configured for exchanging data over the established connection with the terminals from which the terminal-initiated request messages are received.

10. The activation control system according to claim 9, wherein the broadcast message contains at least one activation parameter.

11. The activation control system according to claim 9, further comprising a receiver configured for receiving the terminal-initiated request messages for establishing a connection with the wireless access network from at least two of the plurality of terminals in a cell of the subset at different points in time.

12. The activation control system according to claim 9, wherein the system is further configured for receiving terminal-initiated request messages for establishing a connection with the wireless access network from at least two of the plurality of terminals in different cells of the subset.

13. The activation control system according to claim 9, wherein the system further contains at least one of the following:
a transmission system configured for transmitting a subsequent broadcast message in different subsets of at least one location area;
a receiver configured for receiving the terminal-initiated request messages for establishing a connection with the wireless access network from the terminals following the transmitting of the broadcast message in combination with the data exchanger configured for exchanging data over the established connection with the terminals from which the terminal-initiated request messages are received; or
a receiver configured for receiving terminal location information from the terminals at the location provider.

* * * * *